United States Patent [19]
Imris

[11] 3,842,286
[45] Oct. 15, 1974

[54] APPARATUS FOR PRODUCING OZONE

[76] Inventor: Pavel Imris, Konigsbergerstrasse 4, D-3213 Eldagsen, Germany

[22] Filed: Dec. 8, 1972

[21] Appl. No.: 313,257

[30] Foreign Application Priority Data
Dec. 29, 1971 Germany.............................. 2165249

[52] U.S. Cl................................. 250/535, 250/539
[51] Int. Cl........................................... C01b 13/12
[58] Field of Search ............ 250/535, 532, 539, 536

[56] References Cited
UNITED STATES PATENTS

| | | | |
|---|---|---|---|
| 2,334,377 | 11/1943 | Bennett.............................. | 250/535 |
| 2,615,841 | 10/1952 | Thorp et al.......................... | 250/535 |
| 3,342,721 | 9/1967 | Dibelius et al...................... | 250/539 |

OTHER PUBLICATIONS

Ozone, "Its Manufacture, Properties and Uses" by A. Vosmaer, (1916), pgs. 30–41.

*Primary Examiner*—T. M. Tufariello
*Attorney, Agent, or Firm*—Kurt Kelman

[57] ABSTRACT

Ozone is produced from air or oxygen by passing the same through a channel defined by a first pair of electrodes of opposite polarity and a second pair of such electrodes, the electrodes of the second pair being covered with a dielectric layer, and respective high voltage sources being connected to the electrodes of both pairs.

5 Claims, 3 Drawing Figures

APPARATUS FOR PRODUCING OZONE

The present invention relates to an apparatus for producing ozone from an oxygen-containing gas, such as air or oxygen, wherein the gas is passes through a channel defined by a pair of high voltage electrodes and is converted there by electrical discharge in ozone.

As is known, the splitting of the oxygen modecule may be effected by subjecting oxygen to thermal energy. However, this method is inefficient since elevated temperatures favor the endothermic decomposition of ozone. Thus, even at a temperature of 2,000°C. only about 1 percent, by volume, of the ozone is at oxygen equilibrium, rapid cooling leaving only about one tenth percent because the dropping temperature causes the exothermic decomposition of the ozone to progress.

Therefore, it is useful to permit the atomic oxygen to continue to be produced and to react at low temperatures by supplying electrical or optical or chemical energy since the decomposition equilibrium is reached only very slowly at low temperatures in the absence of catalysts so that the formed ozone remains as a metastable composition.

Electric energy may be supplied, for example, by so-called Siemens Ozonizers which, in essence, are devices comprised of two telescoping glass tubes whose outer and inner walls, respectively, are water cooled and which are electrically connected to the terminals of an AC-power supply. Electric discharges take place in the narrow annular chamber between the glass tube walls when an AC voltage is applied thereto, a dry stream of oxygen or air being passed through this chamber. The gas mixture leaving this electric discharge chamber contains, at best, about 15 percent ozone if pure oxygen is fed to the device.

The production costs of ozone by known means is so high that ozone has not been fully used in all areas where its use has been known to be beneficial. Present production methods require too much expensive energy and known ozone production apparatus uses only about five to fifteen percent of the supplied electrical energy for making ozone, the rest of the electrical energy being converted into heat.

The most widely used method of producing ozone is the method of producing an electrical discharge in a body of air or oxygen. This discharge is effected in a gap between two insulated electrodes to which alternating current is applied. In the first stage of operation, positive ions are collected on the surface of one electrode while negative ions are collected on the opposite insulator, which are discharged in the second stage of operation.

Known electric discharge apparatus for making ozone cannot be operated with direct current because direct current cannot pass through the insulators.

This invention has as its primary object to provide an apparatus for producing ozone free of the indicated disadvantages, and to provide such an apparatus which may be operated with direct current or pulsating direct current.

It is another object of the invention to provide an apparatus of the indicated type wherein the ozone yield is considerably increased and the cost of ozone is correspondingly decreased.

The above and other objects are accomplished in accordance with the present invention with an apparatus comprising a first and a second pair of electrodes of opposite polarity. The electrodes of the second pair are covered with a dielectric layer, and two high voltage sources are connected respectively to the electrodes of the first and second pairs. The electrodes of the first and second pairs define a channel of passage for an oxygen-containing gas whereby the electrical discharge in the channel converts the gas into ozone.

In this apparatus, the electric discharge is effected on the surface of a solid dielectric material between the metastable ions on this material which hold on to it by an electrical potential. A second electric potential causes an electric discharge on the surface of the dielectric material which has very small and brief sparks, and this produces a high concentration of ozone in air or oxygen. No cooling is required because the electric discharge produces little heat. The electrical potential is produced by a direct current source. Direct current, pulsating direct current or alternating current may be used for collecting the metastable ions on the surface of the dielectric layer.

Thus, in principle, the apparatus of this invention uses two additional electrodes coated with a dielectric layer to provide preferred electrical discharge surfaces whereon metastable ions are formed wherebetween brief discharge sparks are then formed.

Since such an electrical discharge produces little heat, no special cooling is required in such apparatus, and since less energy is converted into heat, not much decomposition of the just formed ozone takes place. Also, the apparatus does not require an extremely narrow spark gap between the discharge electrodes proper since the discharge does not take place across a discharge gap but between the metastable ions formed and collected on opposed dielectric surfaces. This makes it possible to increase the input of oxygen-containing gas and thus the number of the metastable ions between which the discharge takes place, thus further increasing the ozone yield.

The above and other objects, advantages and features of the present invention will become more apparent from the following detailed description of certain now preferred embodiments thereof, taken in conjunction with the accompanying schematic drawing wherein FIG. 1 illustrates the basic principle of this invention;

Figure 1:
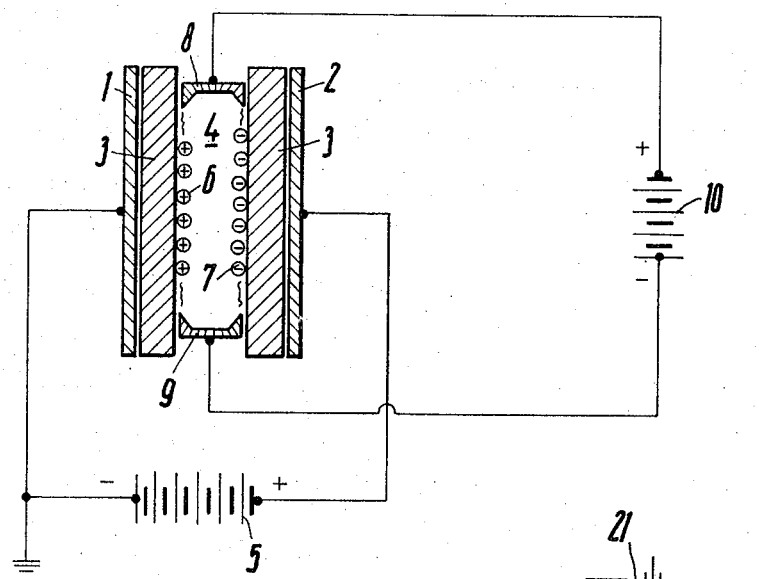

Referring now to the drawing and first to FIG. 1, metal plates 1 and 2 of an electrical condenser are shown to be covered with a solid dielectric layer 3. The two covered electrode plates define a channel of passage 4 through which air or oxygen, i.e., an oxygen-containing gas, are passed. The opposite poles of a high voltage source 5 are connected to the metal plates whereby positive metastable ions 6 are formed on the surface of one dielectric layer 3 while negative metastable ions 7 are formed on the surface of the other dielectric layer 3. A pair of electrical discharge electrodes 8 and 9 is mounted between the covered electrodes 1 and 2 to enclose the channel 4 and to produce an electric discharge therein, the opposite poles of another high voltage source 10 being connected to electrodes 8, 9.

The electrical discharge for the production of ozone in channel 4 takes place between electrodes 8 and 9. The stream of ions of this discharge flows over the surfaces of dielectric layers 3 between the metastable ions on these surfaces. The resultant electrical discharge consists of very short sparks, and about 15 percent to 40 percent of the expended electrical energy is utilized in the ionization, i.e., the ionization of $O_2$ to $O_3$ takes place on the dielectric layer by collision of the metastable oxygen ions and the ions of the electric discharge.

Each collision produces an electrostatic unipolar impulse. The electrostatic impulses may be made visible on an oscillograph, for instance. The frequency of the impulses is in the range of a thousand cycles per second or several hundred million cycles per second. In other words, the present ozone-producing apparatus is a generator of unipolar electrostatic impulses.

The electrical conductivity of the gas on the surfaces of the dielectric layers is higher than if the metastable ions were not present. These metastable ions 6, 7 are collected on the surface of the dielectric layer when an electric potential is produced between the plates 1 and 2. For this purpose, the high voltage source 5 may be a source of direct current, pulsating direct current or alternating current. However, a corona discharge between plates 1 and 2 must be avoided.

Figure 2:
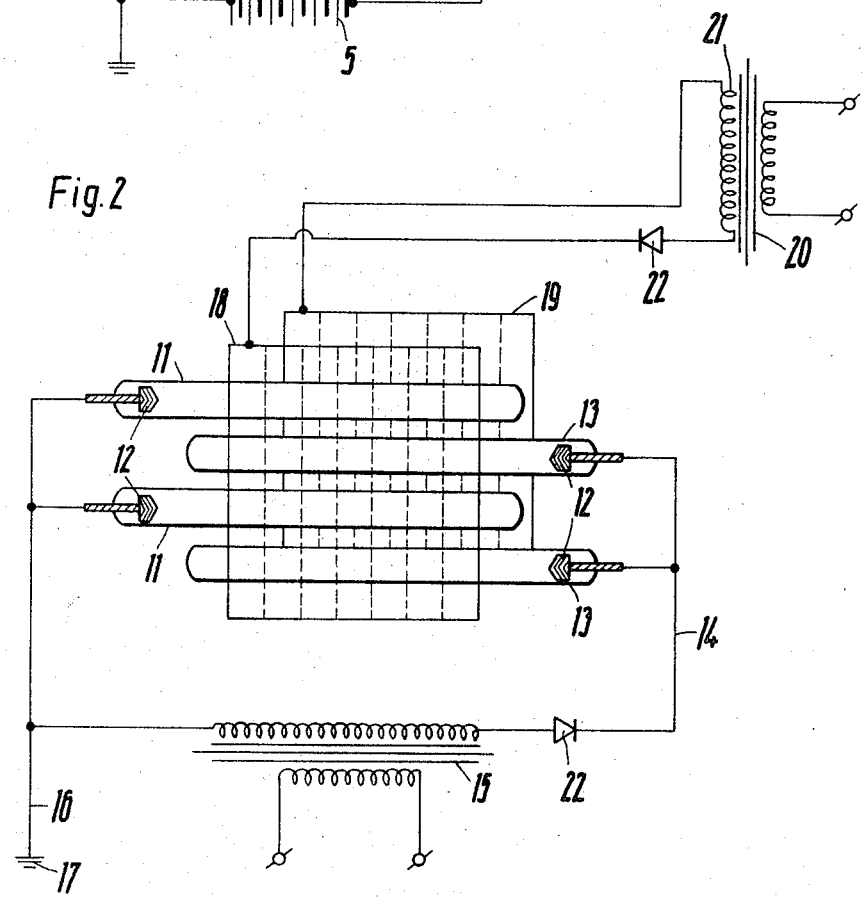
FIG. 2 is a side view of an embodiment of the apparatus without housing.

The embodiment illustrated in FIG. 2 operates on the above principle. It comprises a single-electrode electrical discharge tube 11 which may be a low pressure mercury tube, a xenon or neon discharge tube, or an oxygen discharge tube with very low pressure. Each of the tubes 11 and like tubes 13 contains an electrode 12, the electrodes of the two tubes 11 being connected to one pole of the high voltage source 15 while the electrodes of the two like tubes 13 are connected to the opposite pole of source 15. The electrodes are connected to the high voltage source by high voltage cable 14, while cable 16 leads to ground 17.

A pair of grid electrodes 18, 19 are mounted on respective sides of the discharge tubes to effectuate an electrical discharge therebetween in the same manner as electrodes 9, 8 of FIG. 1. The grid electrodes are connected to insulated secondary winding 21 of high voltage, insulated transformer 20 with very low inductance. Rectifier 22 in the electrode connection supplies direct current or a pulsating direct current to electrodes 18, 19.

Figure 3:
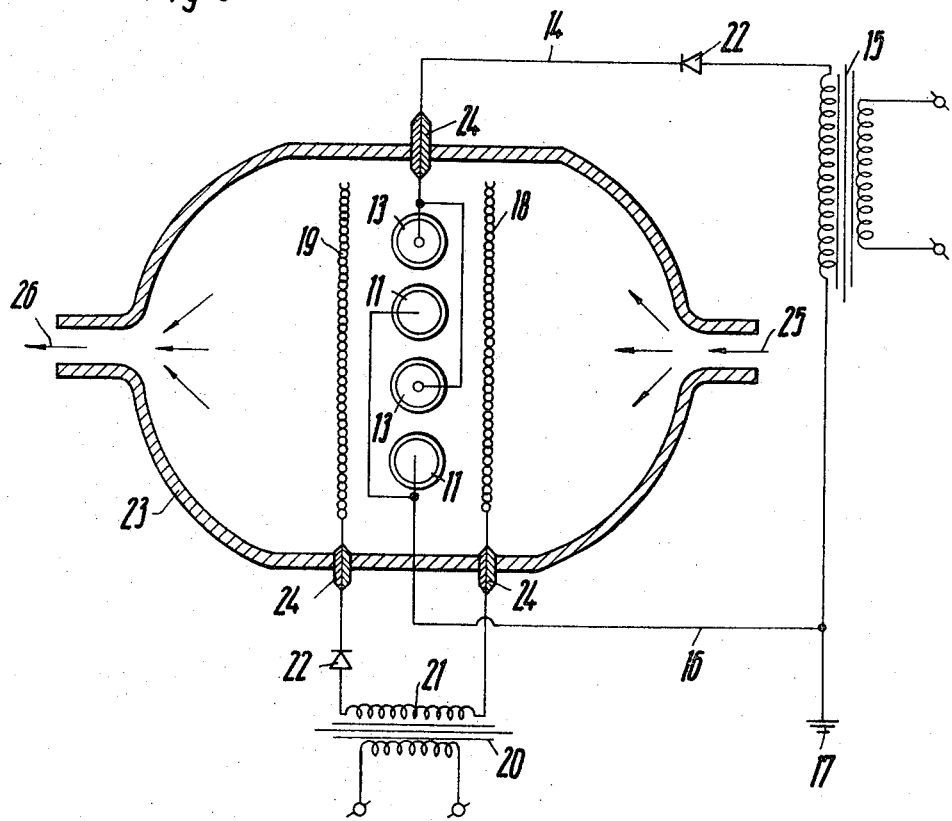
FIG. 3 is a sectional view of another embodiment showing an apparatus with housing.

FIG. 3 shows a modification of the apparatus of FIG. 2, like reference numerals in the two figures designating like parts functioning in a like manner. In this modified apparatus, the electrodes are enclosed by stainless steel housing 23 having an inlet 25 for passing air or oxygen into the housing an outlet 26 for the ozone-containing gas mixture produced in the housing during operation of the apparatus. Insulating sleeves 24 are mounted in the housing to guide the connecting cables from the high voltage sources to the electrodes in the housing.

A high voltage of about 20 to 40 KV (kilovolt) flows from transformer 15 through cable 14 to the single electrode of discharge tube 13. Highest efficiency is obtained by using a pulsating direct current. When pulsating direct current or alternating current is used, the electrical discharge tubes 11 and 13 light up. When the tubes are of quartz glass and are filled with mercury vapor, they will emit ultraviolet light.

Oxygen-containing gas blown into the housing through inlet 25 flows through the grid electrodes 18, 19 and passed the electrical discharge tubes 11, 13 to outlet 26. Transformer 20 produces an electrical potential sufficient to cause electric discharge between electrodes 18 and 19, i.e., a stream of ions between these electrodes. This ion stream flows over the surfaces of the tubes 11, 13 of dielectric material, causing collisions of the metastable ions thereon with the ions of the electric discharge between electrodes 18, 19. The resultant very short sparks are visible. These sparks last no longer than about $10^{-8}$ to $10^{-12}$ seconds and produce very little heat but a very high concentration of ozone. The metastable ions continue to collect on the surfaces of tubes 11, 13, the concentration of these metastable ions depending on the magnitude of the voltage applied to electrodes 12 and being directly proportional thereto.

Since the temperature of the ion stream between electrodes 18, 19 is practically identical with that of the oxygen-containing gas introduced into housing 23 through inlet 25, no cooling of the apparatus is required. Mercury discharge tubes with low pressure have been found useful in this apparatus but other types of tubes, such as xenon tubes, may also be used with success. The tubes may be simple glass tubes filled with an electrically conducting fluid in close contact with the inner wall of the tube. This fluid may be, for instance, a liquid electrolyte, a metallic vapor or the like.

The preferred dielectric material for the tubes is quartz glass, and the outer diameter of the tubes may be about 20 mm.

About 6 to 12 KV direct current are needed for producing an effective electrical discharge between electrodes 18 and 19. The electrodes 18, 19 may be made of very thin stainless steel wire formed into a grid or brush electrode. The transformer 20 must have a very low inductance, such as disclosed and claimed, for instance in my copending application Ser. No. 287,821, filed Sept. 11, 1972, under the title "Electrical Generator," now U.S. Pat. No. 3,760,205.

The high voltage generator 15 must be able to produce a voltage of up to about 60 KV, the best voltage for tubes 11, 13 being a pulsating direct current of a frequency of about 50 cps. The polarity may be positive or negative.

The oxygen-containing gas introduced into housing 23 must be dry.

The following table illustrates the production of ozone in 12 tests, tests 1 to 6 illustrating the preparation of ozone with the known Welsbach Ozonator while test 7 to 12 show the ozone production by means of the apparatus of FIG. 3, with the use of mercury vapor filled quarty glass tubes of 20 mm outer diameter, stainless steel wire grid electrodes, a pulsating direct current of 50 cps applied to the electrodes of the tubes, and 12 KV applied to electrodes 18, 19 by a power supply of the type disclosed in my above-mentioned copending patent.

As the Table shows, the ozone production with the apparatus of the present invention is much more efficient than that with known apparatus, the major reasons for the increased efficiency believed to be:

1. The sparks of short duration produce much more ozone sparks than of longer duration.
2. The short sparks produce less heat, which reduces decomposition of the produced ozone.
3. The electrical resistance of the metastable ions on the surfaces of the dielectric layers is much lower than that of air. Therefore, much less Joule's heat is produced.

TABLE

| Test Number | Type of Gas | Inlet Energy (W) | Gas Flow l/h | Absolute Pressure (atm.) | Ozone Vol. mg o₃/l | Ozone wt % | Ozone production efficiency g O₃/KW hour |
|---|---|---|---|---|---|---|---|
| 1 | air | 25 | 135.8 | 1.46 | 7.1 | 0.60 | 38.4 |
| 2 | air | 25 | 271.7 | 1.45 | 4.3 | 0.37 | 46.4 |
| 3 | air | 105 | 135.8 | 1.48 | 26.2 | 2.20 | 33.8 |
| 4 | O₂ | 32 | 271.7 | 1.45 | 11.2 | 0.84 | 95.0 |
| 5 | O₂ | 33 | 135.8 | 1.49 | 21.4 | 1.60 | 87.8 |
| 6 | O₂ | 73 | 135.8 | 1.46 | 37.0 | 2.76 | 68.7 |
| 7 | air | 28 | 199.6 | 1.70 | 15.4 | 1.29 | 109.6 |
| 8 | air | 27 | 391.2 | 1.80 | 9.2 | 0.77 | 132.9 |
| 9 | air | 45 | 203.7 | 1.70 | 28.8 | 2.42 | 130.2 |
| 10 | O₂ | 33 | 202.5 | 1.75 | 39.7 | 3.03 | 243.3 |
| 11 | O₂ | 35 | 379.4 | 1.88 | 21.4 | 1.63 | 231.7 |
| 12 | O₂ | 45 | 218.3 | 1.77 | 56.8 | 4.33 | 275.3 |

I claim:

1. An apparatus for producing ozone from an oxygen-containing gas, comprising
   1. a first pair of spaced electrodes of opposite polarity,
   2. a first high voltage source connected to the electrodes of the first pair to establish an electrical discharge between the electrodes of the first pair,
   3. a second pair of spaced electrodes of opposite polarity each covered with a dielectric layer, and
   4. a second high voltage source connected to the electrodes of the second pair,
      a. the electrodes of the first and second pairs defining a channel of passage for the oxygen-containing gas and the dielectric layers each having a surface in the channel and in the path of the electrical discharge between the electrodes of the first pair to convert oxygen into ozone.

2. The apparatus of claim 1, wherein the electrodes of the second pair are plates extending substantially parallel to each other, the dielectric layers facing each other, and the electrodes of the first pair extend between the facing dielectrical layers substantially perpendicularly to the electrodes of the second pair.

3. The apparatus of claim 1, wherein the electrodes of the first pair are grid electrodes extending substantially parallel to each other for passing the oxygen-containing gas therethrough substantially transverse to the extension of the grid electrodes, and the electrodes of the second pair are elongated electrodes extending between and substantially parallel to the grid electrodes.

4. The apparatus of claim 3, wherein the electrodes of the second pair comprise electrical discharge tubes.

5. The apparatus of claim 1, wherein the electrodes of the first pair are grid electrodes and the electrodes of the second pair are electrical discharge tubes, and further comprising a housing having a gas inlet and a gas outlet, the electrodes being so arranged in the housing that the electrical discharge tubes are mounted between the grid electrodes.

* * * * *